(12) United States Patent
Miska et al.

(10) Patent No.: US 10,173,489 B2
(45) Date of Patent: Jan. 8, 2019

(54) VEHICLE SUSPENSION CONTROL SYSTEMS AND DEVICES, AND RELATED METHODS

(71) Applicant: FORD GLOBAL TECHNOLOGIES, LLC, Dearborn, MI (US)

(72) Inventors: Paul Miska, Novi, MI (US); Timothy Panagis, Ypsilanti, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 92 days.

(21) Appl. No.: 15/151,820

(22) Filed: May 11, 2016

(65) Prior Publication Data

US 2017/0326937 A1   Nov. 16, 2017

(51) Int. Cl.
| | |
|---|---|
| *G01C 21/00* | (2006.01) |
| *B60G 17/0165* | (2006.01) |
| *B60G 17/015* | (2006.01) |
| *B60G 17/018* | (2006.01) |
| *B60G 17/02* | (2006.01) |
| *B60G 17/052* | (2006.01) |
| *B60G 17/08* | (2006.01) |

(52) U.S. Cl.
CPC ....... *B60G 17/0165* (2013.01); *B60G 17/018* (2013.01); *B60G 17/0155* (2013.01); *B60G 17/02* (2013.01); *B60G 17/052* (2013.01); *B60G 17/08* (2013.01); *B60G 2400/821* (2013.01); *B60G 2400/91* (2013.01); *B60G 2500/10* (2013.01); *B60G 2500/20* (2013.01); *B60G 2500/201* (2013.01); *B60G 2500/30* (2013.01); *B60G 2600/18* (2013.01); *B60G 2600/90* (2013.01); *B60G 2800/162* (2013.01)

(58) Field of Classification Search
CPC .. B60G 17/0155; B60G 17/018; B60G 17/02; B60G 17/052; B60G 17/08
See application file for complete search history.

(56) References Cited

U.S. PATENT DOCUMENTS

| | | | |
|---|---|---|---|
| 7,092,106 | B2 | 8/2006 | Cox et al. |
| 8,260,491 | B2 | 9/2012 | Brighenti et al. |
| 8,825,306 | B2 | 9/2014 | Dankers |

(Continued)

FOREIGN PATENT DOCUMENTS

| | | |
|---|---|---|
| FR | 2683776 A1 | 5/1993 |
| JP | 05310022 A | 11/1993 |
| JP | 2009230273 A | 10/2009 |

OTHER PUBLICATIONS

Koji e tal, JP 5310033 in view of JPO English Translation, Nov. 1993.*

(Continued)

*Primary Examiner* — Ian Jen
(74) *Attorney, Agent, or Firm* — Jones Robb, PLLC; Frank MacKenzie (57) ABSTRACT

A method of controlling a suspension system of a vehicle includes identifying an amplitude and a frequency of at least one harmonic event in a topology of a surface to be traversed by the vehicle, and, with a controller, altering at least one response characteristic of at least one adjustable component of the suspension system based on at least one of the amplitude and frequency of the harmonic event. Systems and methods relate to controlling vehicle suspension systems.

18 Claims, 4 Drawing Sheets

(56) References Cited

U.S. PATENT DOCUMENTS

| | | | |
|---|---|---|---|
| 2003/0018400 A1* | 1/2003 | Tuttle | B25J 9/1605 700/29 |
| 2004/0136438 A1* | 7/2004 | Fullerton | H03C 1/02 375/130 |
| 2004/0212516 A1* | 10/2004 | Bhagavathula | B60R 16/0237 340/901 |
| 2008/0243334 A1* | 10/2008 | Bujak | B60G 17/0165 701/37 |
| 2009/0319123 A1* | 12/2009 | Nardi | B60G 17/018 701/37 |
| 2011/0178673 A1* | 7/2011 | Nakamura | G01G 3/16 701/31.4 |
| 2013/0030680 A1* | 1/2013 | Friedlander | B60W 40/06 701/117 |
| 2015/0054234 A1* | 2/2015 | Marble | B60G 17/08 280/6.157 |

OTHER PUBLICATIONS

Sato et al, JP2009230372 in view of JPO English Translation, 10/009.*
Roszkowski et al, Testing Viscosity of MR Fluid in Magnetic Field, Measurement Science Review, vol. 8, Section 3, No. 3, 2008.*
Subject Matter Eligibility Example, Jul. 2015 Updated Appendix 1.*
NPL: Topology/Surface, Date:N/A.*

* cited by examiner

VEHICLE SUSPENSION CONTROL SYSTEMS AND DEVICES, AND RELATED METHODS

TECHNICAL FIELD

The present disclosure relates generally to systems configured adjust response characteristics of vehicle chassis components, and related methods.

BACKGROUND

Vehicle suspension systems include resilient devices configured to absorb forces such as road shock and other vibrations while providing a smooth and comfortable ride for vehicle occupants. Such devices may include springs, such as coil springs, leaf springs, torsion bars, etc. configured to store such forces by compression and/or extension, and dampers configured to dissipate the forces by dampening oscillation of the springs. Parameters such as spring rate of the springs and damping forces, such as compression damping, i.e., the damping force acting against compression of the spring, and rebound damping, i.e., the damping force acting against extension of the spring, and other parameters and characteristics are chosen as a compromise between occupant comfort and chassis stability under, e.g., high-speed or emergency maneuvers.

Suspension systems may include control systems configured to recognize irregularities (e.g., potholes, bumps, etc.) in a surface to be traversed by the vehicle, and adjust suspension characteristics based on the location and size of the irregularity to provide a more comfortable ride. For example, such systems may include optical or radar detectors that map the surface, and may soften a compression damping force of a damper of the suspension system as the vehicle approaches the irregularity to provide a more comfortable ride for the vehicle occupants. However, if the vehicle encounters a series of repeated irregularities with a substantially regular frequency, the suspension system may not adjust in a manner that effectively absorbs the forces generated as the vehicle travels over the irregularities. It may be desirable to provide a suspension system that is able to effectively absorb forces as encountered regardless of the timing between occurrences.

SUMMARY

In accordance with various exemplary embodiments, a method of controlling a suspension system of a vehicle includes identifying an amplitude and a frequency of at least one harmonic event in a topology of a surface to be traversed by the vehicle, and, with a controller, altering at least one response characteristic of at least one adjustable component of the suspension system based on at least one of the amplitude and frequency of the harmonic event.

In accordance with various exemplary embodiments, a method of controlling a suspension system of a vehicle comprises sensing information indicative of amplitude of a harmonic event of a surface to be traversed by the vehicle as a function of time. The method also includes, with a controller, transforming the sensed information into information relating to the amplitude of the harmonic event as a function of a frequency of the harmonic event, and with the controller, altering a response characteristic of the suspension system of the vehicle responsive to one or both of the frequency and amplitude of the harmonic event.

In accordance with various exemplary embodiments, a system for controlling a suspension system of a vehicle includes a sensor configured to collect information relating to an amplitude of a harmonic event in a topology of a surface to be traversed by the vehicle as a function of time. A control system is operatively coupled to the sensor and configured to transform the collected information into information relating to the amplitude of the harmonic event as a function of a frequency of the harmonic event. A component is operatively coupled to the control system and is configured to alter at least one response characteristic of the suspension system responsive to a signal from the control system based on at least one of the amplitude and the frequency of the harmonic event.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of exemplary embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. The features explained individually in the description can be mutually combined in any technically expedient manner and disclose additional embodiments of the present disclosure.

The present disclosure relates to vehicle systems and methods configured to improve (e.g., optimize) responses of active and semi-active suspension systems to harmonic (i.e., repetitive) irregularities in a surface to be traversed by the vehicle. For example, methods of the disclosure include collecting information related to a harmonic event in a surface to be traversed by the vehicle and adjusting at least one response characteristic of the suspension system responsive to the information. Such information may include information related to an amplitude of the harmonic event expressed as a function of time. The information may be transformed by a mathematic transform, such a fast Fourier transform (FFT), into information related to the amplitude of the harmonic event expressed as a function of a frequency of the harmonic event. The one or more response characteristics of a suspension system of the vehicle may be adjusted based on the information related to the amplitude and frequency of the harmonic event obtained by the transform.

Systems of the disclosure may include a sensor configured to generate information representing a topology of the surface to be traversed by the vehicle. The sensor may be operatively connected to a control system (e.g., ECU and associated electronics) of the vehicle configured to carry out the transform discussed above. The control system may use the information relating to the amplitude and frequency of the harmonic event to adjust one or more response characteristics of the suspension system of the vehicle. For example, in an exemplary embodiment, systems and methods of the disclosure may be configured to alter one or both of compression damping and rebound damping of a suspension damper of the vehicle.

In contrast, conventional active and semi-active suspension systems may not be configured to collect and evaluate information related to frequency of a repetitive irregularity, and may not be capable of absorbing such irregularities effectively (e.g., optimally). As a non-limiting example, in conventional active and semi-active suspension systems, rebound damping may not be altered, or may be altered in a manner that fails to optimally absorb a repetitive irregularity. For example, under some conditions, when the vehicle encounters several, constructive irregularities in series, the suspension may not extend fully between each encounters, and the remaining suspension travel may not be sufficient to absorb subsequent irregularities. This condition may be referred to as suspension "pack up," and may result in a rough ride over the repetitive irregularity.

Systems and methods of the disclosure are configured to recognize various types of irregularities, including repetitive irregularities having a generally regular frequency, and are configured to respond to such irregularities by altering one or more response characteristics of the suspension system in response to the frequency. For example, as discussed in greater detail below, systems and methods of the disclosure may be configured to alter one or both of compression and rebound damping of a suspension damper, spring rate of an adjustable spring, or other response characteristics of the suspension system.

Figure 1:
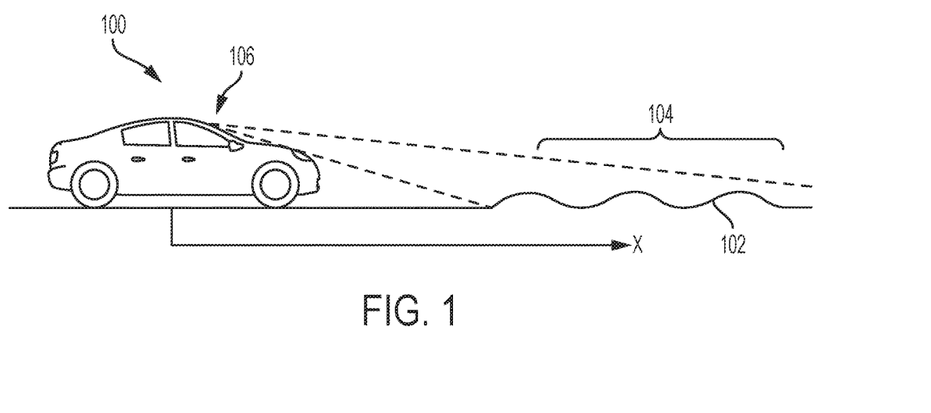
FIG. 1 is a schematic representation of a vehicle and a surface to be traversed by the vehicle according to an exemplary embodiment of the disclosure.

Referring now to FIG. 1, a schematic representation of a vehicle 100 is shown traversing a surface 102 in a direction x. The surface 102 may be or include a road, off-road track, or any surface to be traversed by the vehicle 100. The surface 102 may exhibit a topology including at least one harmonic event 104. The harmonic event 104 may be or include a series of bumps in the surface 102, a series of depressions in the surface 102, or any other anomaly repeating at a generally regular frequency. In some embodiments, the harmonic event 104 may be an oscillation (e.g., an event with a wave-like nature) in the surface 102 with an amplitude A and a frequency $\omega$. The frequency $\omega$ of the harmonic event 104 may be defined by the spatial distance between equal amplitudes (e.g., crests or troughs) of the harmonic event 104 and the velocity of the vehicle 100.

The vehicle 100 may include a sensor 106 configured to collect information (e.g., data) regarding the topology of a portion of the surface 102 to be traversed by the vehicle 100. For example, the sensor 106 may be configured to collect information regarding the harmonic event 104 and transmit the collected (e.g., sampled) information to a controller 408 (FIG. 4) which may form a portion of a control system (e.g., an electronic control unit (ECU) including at least one central processing unit (CPU)) of the vehicle 100. The sensor 106 may be or include one or more of an optical sensor, a radar system, a LADAR system, ultrasonic, or any other system configured to collect information regarding the topology of the surface 102. The sensor 106 may be configured to sample the topology of the surface 102 at regular, discrete time intervals. For example, the sensor 106 may have a sampling rate of 1 millisecond, 10 milliseconds, 100 milliseconds, 1 second, etc. In an exemplary embodiment, the sensor 106 may be configured to sample the topology every 100 milliseconds. In some embodiments, the sampling rate of the sensor 106 may be constant. Additionally or alternatively, the sampling rate of the sensor 106 may vary depending on the speed of the vehicle 100, the topology of the surface 102 sampled by the sensor 106, etc. For example, in some embodiments, the sampling rate of the sensor 106 may increase as the vehicle speed increases, may increase as the vehicle encounters portions of the surface 102 with relatively irregular topology, etc.

Figure 4:
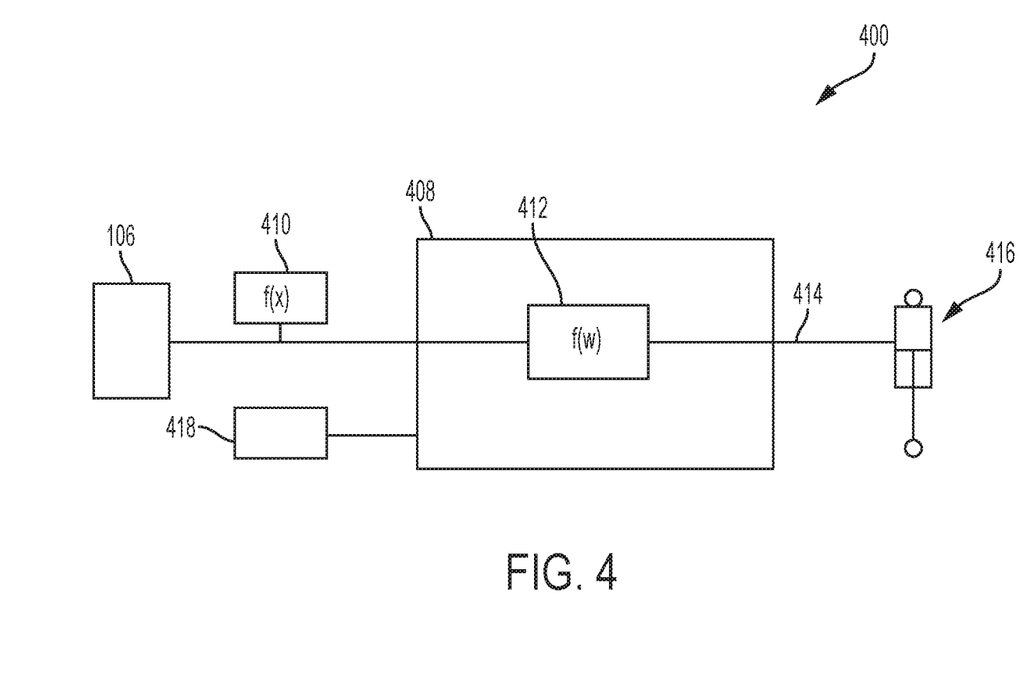
FIG. 4 is a schematic representation of an exemplary embodiment of a system including a sensor, a controller, and a suspension component according to the disclosure.

The information collected by the sensor 106 may include one or more characteristics of the topology of the surface 102 expressed as a function of position on the surface 102. In an exemplary embodiment of the disclosure, the topology of the surface 102 may be represented as an amplitude of the surface 102 expressed as a function of a position x on the surface 102. For example, the sensor 106 may collect information regarding amplitude of a portion of the surface 102 within a sensing range ahead of the sensor 106. The amplitude information may be correlated with a position within the sensing range, and the information may be transmitted to the controller 408 (FIG. 4).

Additionally or alternatively, in exemplary embodiments, the topology of the surface 102 may be represented as an amplitude of the surface 102 expressed as a function of time. For example, the sensor 106 may collect information regarding the amplitude of the surface 102 within the sensing range of the sensor 106. Information regarding a speed of the vehicle, e.g., provided by a vehicle speed sensor 418 (FIG. 4), may be used to correlate the positions of the recorded amplitudes throughout the sensing range with an expected time at which the vehicle 100 will encounter the sensed amplitudes. Such correlations may be carried out by a controller of the vehicle 100, such as controller 408 (FIG. 4), using look-up tables, real-time calculations, etc.

Exemplary embodiments include methods and systems configured to process the amplitude information collected by the sensor 106 to identify a frequency, or frequencies, of the harmonic event 104, and to adjust a component of the vehicle based on the identified amplitude and frequency of the harmonic event 104, as described below. Such identification of frequency of the harmonic event 104 may be accomplished by any appropriate method, such as numerical analysis methods, look-up tables, real-time mathematical calculations, etc., carried out by a control system of the vehicle, such as the controller 408 (FIG. 4).

For example, according to an exemplary embodiment of the disclosure, the information collected by the sensor 106 related to the amplitude of the harmonic event 104 (FIG. 1) may be transformed from data in the position domain (i.e., position along the direction x) or time domain to information in the frequency domain. Such information may then be used to alter one or more response characteristics of the suspension system so that the suspension system can appropriately respond to the topology of the surface 102, as will be discussed in detail below in connection with FIG. 4.

In an exemplary embodiment, the information collected by the sensor 106 may be transformed by Fourier analysis, in which a waveform is expressed as a composite of one or more sine and/or cosine terms, each having a specific frequency. In an exemplary embodiment, the information collected by the sensor 106 may be transformed by a fast Fourier transform algorithm. While the embodiments described herein may make specific reference to fast Fourier transforms, any other transform for converting information in time or space domain to frequency domain may be employed, such as discrete Fourier analysis, wavelet transform, S-Transform, combination of numerical transformation methods, etc. Fast Fourier transform algorithms may provide certain advantages over other transform algorithms, such as robustness and low processing power required compared to some other transforms. Those of skill in the art will recognize that various specific fast Fourier transform (FFT) algorithms may be employed, such as the Cooley-Tukey FFT algorithm, the prime-factor FFT algorithm, Bruun's FFT algorithm, etc.

Figure 2:
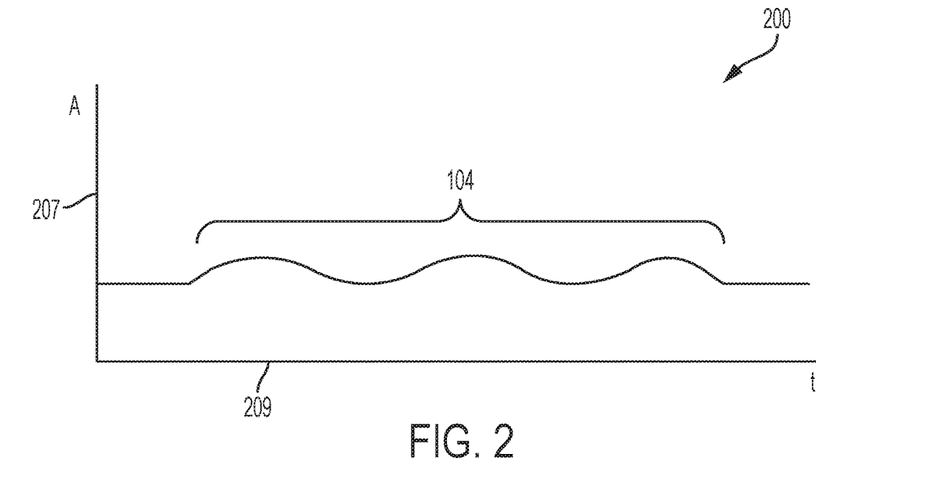
FIG. 2 is a graphical representation of a harmonic event in a topology of a surface according to an exemplary embodiment of the disclosure with an amplitude expressed as a function of time.

Referring now to FIG. 2, a graphical representation 200 of the harmonic event 104 in the topology of the surface 102 (FIG. 1) is shown. Amplitude A is represented by position on the vertical axis 207, and time t is represented by position on the horizontal axis 209. While the harmonic event 104 is illustrated having a shape similar to a sine wave, harmonic events contemplated by the disclosure may include any shape having a repetitive nature, as discussed above. The amplitude A as a function of time t may be obtained by, e.g., correlating positions of the various amplitudes of the harmonic event 104 with a vehicle speed as described above.

Figure 3:
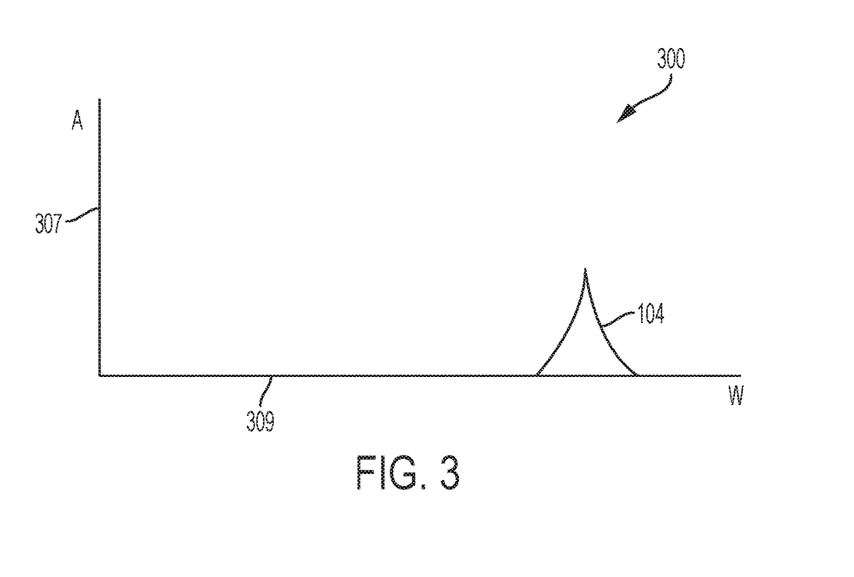
FIG. 3 is a graphical representation of the harmonic event of FIG. 2 with the amplitude expressed as a function of frequency.

FIG. 3 is a graphical representation 300 of the topology of the surface 102 as shown in FIG. 2 after being transformed (e.g., by an FFT algorithm as described above) to frequency domain. In FIG. 3, the amplitude A of the harmonic event 104 is represented on the vertical axis 307, and the frequency of the harmonic event 104 is represented on the horizontal axis 309. While in FIG. 3 the harmonic event 104 is represented as having a single frequency ω, harmonic events within the scope of the disclosure may be represented as having more than one frequency ω, at the same or different frequencies. For example, a harmonic event 104 may be represented as a composite of multiple discrete frequencies, the combination of which forms the harmonic event 104 represented in FIG. 2.

Referring now to FIG. 4, a schematic representation of a system 400 of a vehicle 100 (FIG. 1) is shown. The system 400 may include a sensor 106, such as an optical, radar, or LADAR sensor as discussed above, configured to sample a portion of a surface 102 (FIG. 1) to be traversed by the vehicle 100. The sensor 106 may be operatively coupled with a control system such as controller 408, which may be or include an electronic control unit (ECU) including a central processing unit (CPU). As discussed above, the sensor 106 may collect information relating to the amplitude of a harmonic event 104 (FIG. 1) in the topology of the surface 102, expressed as a function 410 of position on the surface 102. The information may be transmitted from the sensor 106 to the controller 408. The controller 408 may be configured to transform the information from time or position domain to frequency domain, as discussed above. For example, the controller 408 may be configured to apply an FFT algorithm to the information to transform the information into the frequency domain. Information relating to the amplitude of the harmonic event 104 expressed as a function 412 of frequency generated by the controller 408 may be utilized to generate a control signal 414 to control a suspension component 416. The suspension component 416 may be or include an adjustable damper, such as a damper with one or more adjustable fluid passages, a magnetorheological (MR) damper, an adjustable spring, such as an air spring, or any other suspension component with one or more adjustable response characteristics. In an exemplary embodiment, the suspension component 416 may be an adjustable damper forming a portion of a continuously-controlled damping (CCD) system. In the illustrated embodiment, the suspension component 416 is a fluid-filled damper with electronically adjustable compression and rebound damping characteristics. Such adjustment may include altering a size and/or number of orifices through which a damping fluid may flow during operation of the damper, application of an electromagnetic field to alter an apparent viscosity of a magnetorheological fluid, etc.

Information regarding the frequency of the harmonic event 104 (FIG. 1) may be utilized by the controller 408 to control the suspension component 416. For example, in an exemplary embodiment, the controller 408 may transmit a signal to the suspension component 416 to reduce a compression damping force of the suspension component 416 when the controller recognizes an upcoming irregularity in the surface 102 (FIG. 1), thereby allowing the suspension component 416 to react (i.e., compress) to a greater degree in response to the irregularity. In an exemplary embodiment, timing of the signal to reduce the compression damping force of the adjustable suspension component 416 may be based on the identified frequency of the harmonic event 104 and information regarding a speed of the vehicle 100 (FIG. 1) obtained by a vehicle speed sensor 418 operatively coupled with the controller 408.

The controller may send a signal to the adjustable suspension component 416 to soften a rebound damping force of the adjustable suspension component 416 depending on the frequency of the harmonic event 104 (FIG. 1). For example, for harmonic events with relatively low frequency, or infinite frequency (i.e., a single, non-harmonic irregularity), the rebound damping of the adjustable suspension component 416 may be unchanged from a baseline setting. This may enhance the stability of the vehicle by damping the rebound action of the suspension component 416 and ensuring the suspension returns to an original ride height in a gradual and controlled manner after the vehicle contacts the irregularity.

When the controller 408 identifies a harmonic event, such as harmonic event 104 (FIG. 1) where, based on the speed of the vehicle 100, peak amplitudes of a series of irregularities occur so frequently that the suspension component 416 would be unable to return to an original ride height prior to contact with a subsequent irregularity, the controller 408 may send a signal to the adjustable suspension component 416 to soften the rebound damping of the suspension component 416. A softer rebound damping force than the baseline rebound damping force may allow the suspension component 416 to return to a full ride height prior to contacting a subsequent irregularity of the harmonic event 104, thus reducing (e.g., eliminating) suspension "pack up" and improving body control and stability of the vehicle 100

(FIG. 1). Additionally or alternatively, the particular changes to compression and/or rebound damping may be timed based on the frequency and amplitude characteristics of the harmonic event 104. For example, the compression damping may be softened prior to contact with each individual irregularity of the harmonic event 104, the rebound damping may be softened following contact with each individual irregularity of the harmonic event 104 to facilitate the vehicle suspension returning to a position at which the suspension is able to effectively absorb the next individual irregularity of the harmonic event 104, etc.

The controller 408 may base the control signals transmitted to the adjustable suspension component 416 on the identified frequency characteristics using look-up tables, real-time calculation of mathematical equations that relate the frequency of the harmonic event 104 and speed of the vehicle 100 to determine the appropriate time to adjust the response characteristic of the adjustable suspension component 416.

Additionally or alternatively, the adjustable suspension component 416 may be or include an adjustable spring, such as a pneumatic spring. A spring rate of the adjustable spring may be altered to change the response of the vehicle 100 (FIG. 1) to the harmonic event 104 (FIG. 1). For example, the spring rate may be altered such that the ride frequency of the vehicle is substantially matched to the frequency of road surface, thereby enabling the suspension of the vehicle to more closely follow a surface with a harmonic irregularity.

Figure 5:
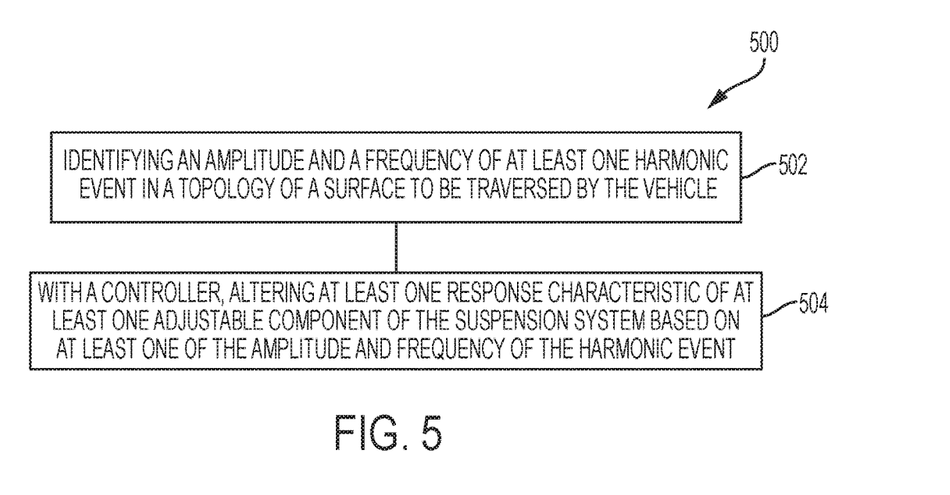
FIG. 5 is a flow chart representing an exemplary embodiment of a method of the disclosure.

FIG. 5 is a flowchart showing a method 500 of controlling a suspension system of a vehicle. The method 500 includes action 502, identifying an amplitude and a frequency of at least one harmonic event in a topology of a surface to be traversed by the vehicle, and action 504, with a controller, altering at least one response characteristic of at least one adjustable component of the suspension system based on at least one of the amplitude and frequency of the harmonic event.

Figure 6:
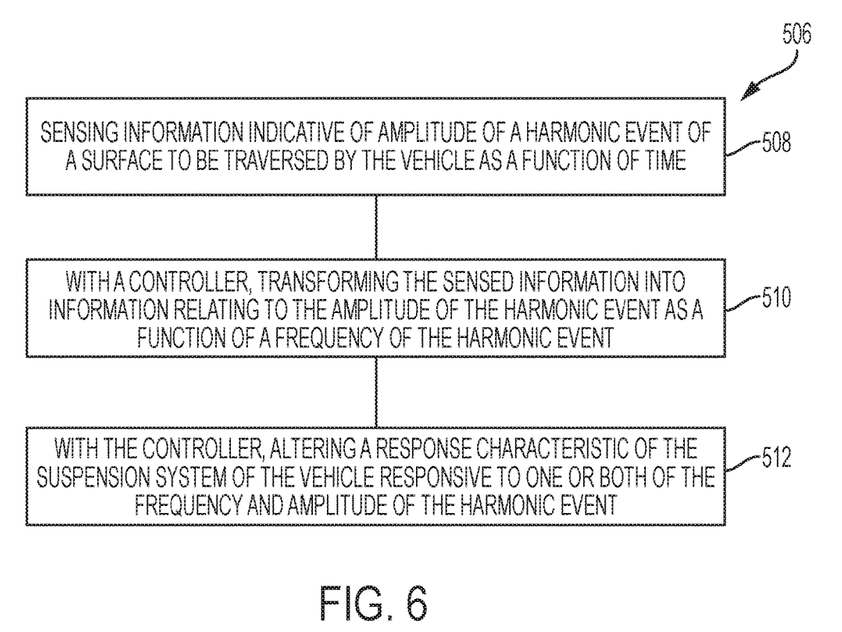
FIG. 6 is a flow chart representing another exemplary embodiment of a method of the disclosure.

FIG. 6 is a flowchart showing a method 506 of controlling a suspension system of a vehicle. The method 506 includes action 508, sensing information indicative of amplitude of a harmonic event of a surface to be traversed by the vehicle as a function of time. The method 506 also includes action 510, with a controller, transforming the sensed information into information relating to the amplitude of the harmonic event as a function of a frequency of the harmonic event. Finally, the method 506 includes action 512, with the controller, altering a response characteristic of the suspension system of the vehicle responsive to one or both of the frequency and amplitude of the harmonic event.

In the description above, reference may be made to the controller (e.g., ECU) as a single component. However, this configuration is merely an example and is subject to a variety of implementation-specific variations. For example, in some embodiments, the functions described in reference to the controller may be performed across multiple controllers or among multiple components of the controller. The controllers and/or processors disclosed herein may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system of the controller to operate the logic or portions of the logic presented in the methods disclosed herein. For example, in certain embodiments, the controller may include computer code disposed on a computer-readable storage medium or a process controller that includes such a computer-readable storage medium. The computer code may include instructions, data maps such as look-up-tables, algorithms, etc.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiments described herein be considered as exemplary only.

What is claimed is:

1. A method of controlling a suspension system of a vehicle, comprising:
    with a sensor operably coupled with a controller, identifying an amplitude and a frequency of at least one harmonic event in a surface to be traversed by the vehicle; and
    with the controller, altering at least one of compression and rebound damping of a damper of the suspension system based on at least one of the amplitude and frequency of the harmonic event.

2. The method of claim 1, wherein identifying an amplitude and a frequency of the at least one harmonic event in the surface to be traversed by the vehicle comprises identifying information representing the amplitude of the harmonic event as a function of time.

3. The method of claim 2, further comprising transforming the information representing the amplitude of the harmonic event as a function of time into information representing the amplitude of the harmonic event as a function of the frequency of the harmonic event.

4. The method of claim 3, wherein transforming the information representing the amplitude of the harmonic event as a function of time into information representing the amplitude of the harmonic event as a function of the frequency of the harmonic event comprises applying Fourier analysis to the information representing the amplitude of the harmonic event as a function of time.

5. The method of claim 4, wherein applying Fourier analysis to the information representing event amplitude as a function of time comprises applying a fast Fourier transform (FFT) to the information representing event amplitude as a function of time.

6. The method of claim 1, further comprising altering a spring rate of an adjustable spring of the suspension system based on at least one of the amplitude and frequency of the harmonic event.

7. The method of claim 6, wherein altering the spring rate of an adjustable spring of the suspension system comprises altering a spring rate of a pneumatic spring.

8. The method of claim 1, wherein altering at least one of compression and rebound damping of the damper of the suspension system based on at least one of the amplitude and frequency of the harmonic event comprises altering an apparent viscosity of a magnetorheological fluid within a damper.

9. The method of claim 1, further comprising altering a ride height of the vehicle based on at least one of the amplitude and frequency of the harmonic event.

10. A method of controlling a suspension system of a vehicle, comprising:
    with sensor operably coupled to a controller, sensing information indicative of amplitude of a harmonic event comprising a series of individual irregularities in a surface to be traversed by the vehicle as a function of time;
    with the controller, transforming the sensed information into information relating to the amplitude of the harmonic event as a function of a frequency of the harmonic event; and
    with the controller, altering a response characteristic of the suspension system of the vehicle based on a location of each irregularity of the series of individual irregularities identified using the frequency of the harmonic event.

11. The method of claim 10, wherein transforming the sensed information into information relating to the amplitude of the harmonic event as a function of a frequency of the harmonic event comprises performing Fourier analysis on the sensed information.

12. The method of claim 11, wherein performing Fourier analysis sensed information comprises performing a fast Fourier transform (FFT) on the sensed information.

13. A system for controlling a suspension system of a vehicle, comprising:
    a sensor configured to collect information relating to an amplitude of a harmonic event in a surface to be traversed by the vehicle as a function of time;
    a control system operatively coupled to the sensor and configured to transform the collected information into information relating to the amplitude of the harmonic event as a function of a frequency of the harmonic event; and
    a component operatively coupled to the control system and configured to alter at least one response characteristic of the suspension system at a frequency equal to the frequency of the harmonic event.

14. The system of claim 13, wherein the controller is configured to transform the collected information into information relating to the amplitude of the harmonic event as a function of a frequency of the harmonic event using a fast Fourier transform (FFT).

15. The system of claim 13, wherein the harmonic event in the surface to be traversed by the vehicle comprises an oscillation in the surface traversed by the vehicle.

16. The system of claim 13, wherein the sensor comprises an optical sensor.

17. The system of claim 13, wherein the component comprises a suspension damper.

18. The system of claim 17, wherein the at least one response characteristic comprises one or both of a compression damping force and a rebound damping force of the suspension damper.

* * * * *